United States Patent Office 3,580,832
Patented May 25, 1971

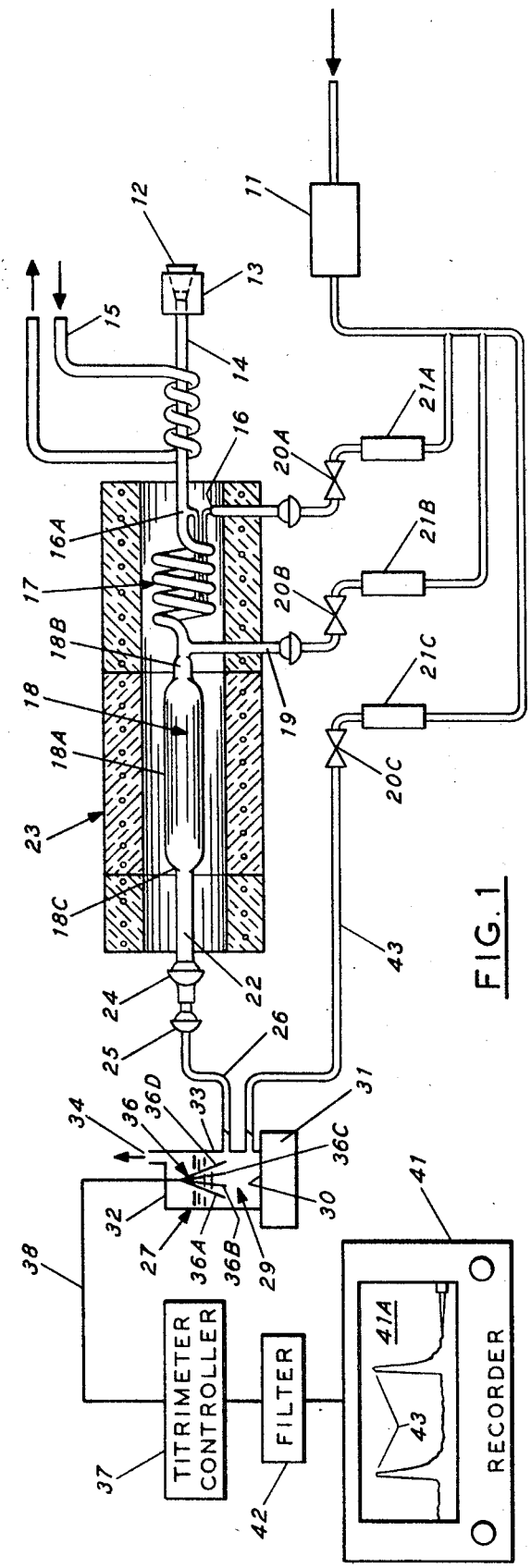
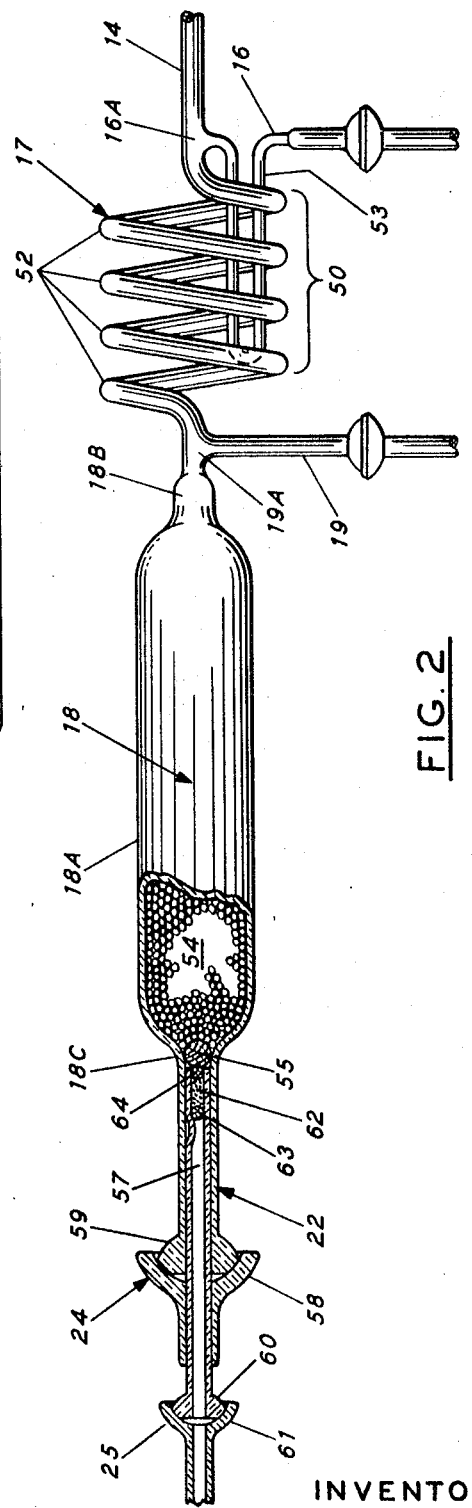
FIG. 1
FIG. 2
INVENTOR
DAVID R. RHODES

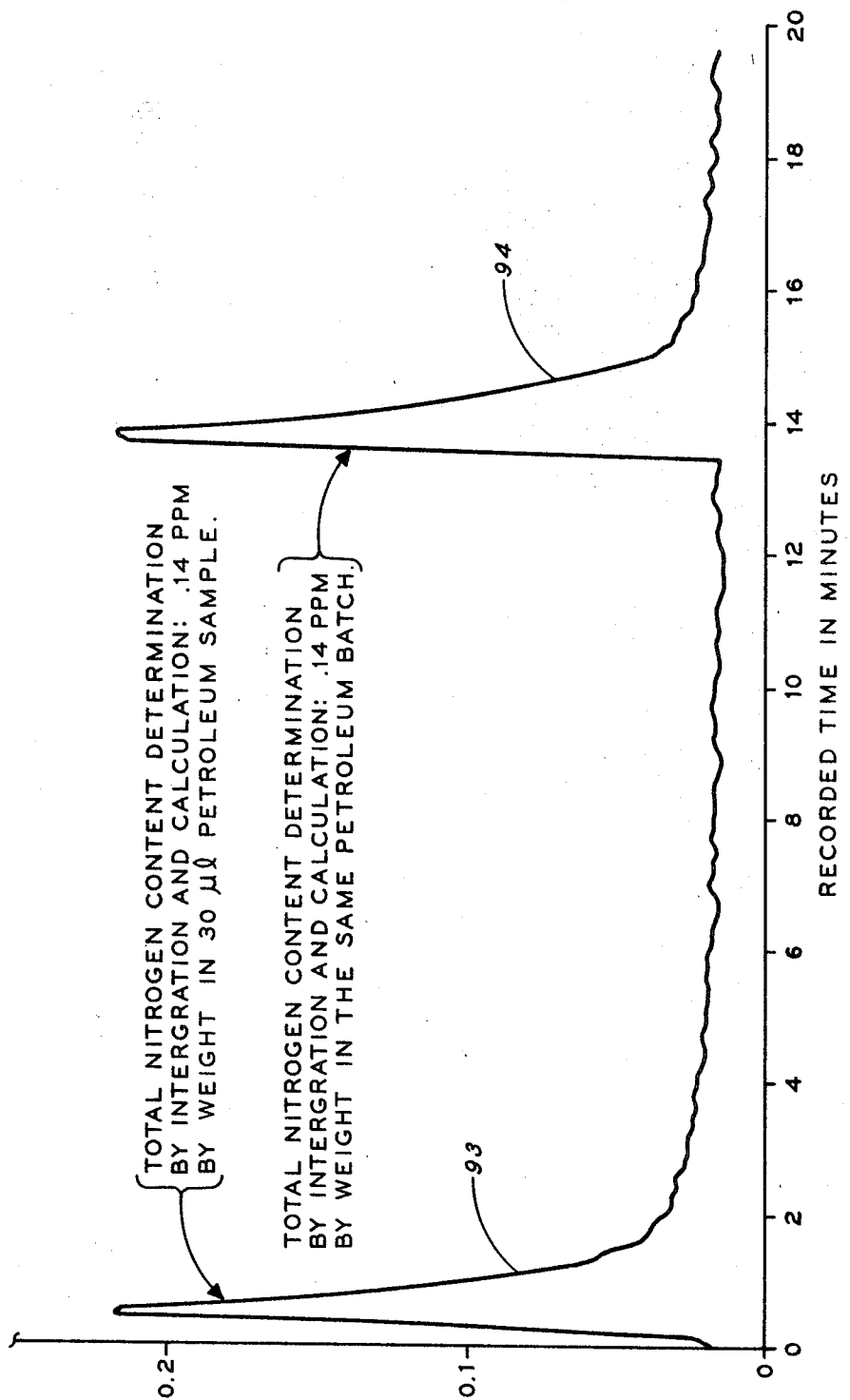

3,580,832
ELECTROLYTIC COULOMETER TITRATION SYSTEM
David R. Rhodes, Novato, Calif., assignor to Chevron Research Company, San Francisco, Calif.
Filed Feb. 13, 1968, Ser. No. 705,179
Int. Cl. G01n 27/44
U.S. Cl. 204—195    2 Claims

ABSTRACT OF THE DISCLOSURE

The presence and concentration of a constituent within either a continuous or discontinuous flowing sample, is determined by means of a coulometer titration system including (i) a titration cell containing hydrogen saturated electrolyte, subject to pressure variations, for absorbing the constituent, or a quantitatively related component thereof, to thereby change the hydrogen ion concentration (pH) of the electrolyte from a predetermined pH set point level, (ii) potential developing electrodes disposed in the electrolyte for sensing said change in hydrogen ion concentration from said set point level by means of a voltage produced therebetween, (iii) a pair of generating electrodes for electrolytically producing, in the electrolyte, in response to said voltage just enough of a component reactable with the constituent being analyzed for, or component thereof, to neutralize the constituent or component thereof, to return said hydrogen ion concentration to its predetermined set point level, and (iv) recording means maintaining a continuous record of the component reactable with the said constituent, or component thereof, so as to indicate the presence and concentration thereof within the titration cell. The present invention contemplates the use of first and second potential electrodes including an improved hydrogen-dissolved-in-palladium sensing electrode adapted, in combination, with a reference electrode to extend the response range of the system to detect low concentrations of the constituent being analyzed for, or component thereof, by dampening the rate of change, with time, of a potential developed between the improved sensing electrode and the reference electrode due to changes in hydrogen partial pressure at the surface of the improved sensing electrode. Preferably, the improved sensing electrode has a hydrogen-palladium (H/Pd) atomic ratio greater than 0.03 and up to and including about .60.

---

This invention relates to determination of the concentration of one or more constituents of a fluid. More particularly, this invention relates to the determination of the concentration of a constituent within a liquid organic materials by the conversion of the constituent to a gas phase in the presence of a catalyst followed by titration of the resulting gaseous compound within a coulometric titration cell. An electric current is applied electrolytically to change the compositional characteristic of the electrolyte within the cell in a manner such that the desired measurement for determining the concentration may be obtained in terms of electrical quantity correlated with the aforesaid change of the compositional characteristic. Still more particularly, the invention relates to a process for the determination of the concentration of nitrogen within complexed petroleum materials by catalytic and titration reactions in a hydrogen gas stream.

It is important in many processes to accurately measure the concentration of one or more constituents of liquid solutions used or produced by the process. Measurements of this type are often necessary for such uses as, inter alia, controlling the treatment accorded a product, or indicating the composition of a final chemical product.

Within the petroleum industry, analysis of hydrocarbons for the presence of organic nitrogen is of particular importance. Nitrogen compounds are known to be poisonous to the catalyst used in hydrocarbon conversion processes. Careful control of certain blending and pre-treating operation requires considerable information on the nitrogen content of hydrocarbon feedstocks. For example, total nitrogen content in the range of one part per million and lower, by weight of sample, are often required for a variety of feedstocks and petroleum products.

Heretofore, measurements of compositional characteristics of a substance have been accomplished by a variety of analysis techniques. For example, in volumetric analysis, a reagent of known concentration is added in known quantities sufficient to just produce a stoichiometric reaction, which commonly is referred to as bringing the solution to an "end-point." The term "end-point" means that a given compositional characteristic of a material has a known value, whether the value be a particular magnitude related to the compositional characteristic, or whether it be the absence of the particular substance originally in the solution. More particularly, in acidimetry or alkalimetry, a reagent, either a base or an acid of known concentration, is added to a known volume of a sample until the desired end-point is obtained. Knowing the concentration and the volume of the added base or acid, the acidity or alkalidity of the original sample may be ascertained. Systems of this characteristic require not only highly accurate measurement of the volume of the added reagent, but they also require equally accurate knowledge of the concentration of the reagent. Accordingly, the low range threshold sensitivity of such systems is limited.

To increase the range of response, it has been proposed to use coulometric techniques in which an electric current is generated within the electrolyte of the coulometric titration cell in proportion to the change in the compositional characteristics of the substance being monitored. The desired measurement may be attained in terms of an electrical quantity charge (coulombs) correlated with the aforesaid change in the compositional characteristic. For example, in determining a total acidity or a total alkalidity of solutions, an electrical current can be applied to the solution as to electrolytically produce a titrating agent to react with the components analyzed for, to maintain a constant concentration within the cell. The rate of flow of the current is equal to the amount of change of the constituent compositional characteristic within the electrolyte. By the correlation between the rate of production of the titrant and the current flow, the quantity of the titrant formed in a given time may be known in terms of coulombs. Furthermore, the quantity of titrant can be directly related to either the amount of constituent added or the amount of change of the compositional characteristic in the electrolyte.

In adapting the aforementioned coulometric titration systems to the determination of nitrogen content within complexed petroleum products, it has been proposed to first use a pyrolytic reaction to quantitatively convert nitrogen compounds to ammonia, followed by a titration reaction to just generate sufficient hydrogen ions to react with hydroxyl ions produced in the electrolyte by the ammonia. The nitrogen is usually quantitatively converted (hydrogenated) to ammonia in the presence of catalyst within a catalyst section connected to a titration cell supporting the electrolyte. The ammonia is swept by excess hydrogen gas from the catalyst section to the cell. As the ammonia dissolves in the electrolyte, automatic and continuous titration of the ammonia occurs. To sense the change in hydrogen ion concentration in the titration cell, a pair of potential developing electrodes (a sensing and a reference electrode) are disposed in the electrolyte. To generate the titrant in the electrolyte, the electric current is passed electrolytically, in response to a potential change by a pair of generating electrodes at a rate and duration just sufficient to maintain a constant hydrogen ion concentration (pH) within the cell. The quantity of flow of current is indicated at a potentiometric recorder as a voltage-versus-time record, the resulting record being not only determinative of the amount of titrant generated, but also indicates the nitrogen content, by weight, in the sample. In the titration cell, the entering hydrogen gas is used for generating hydrogen ions, in situ, to neutralize the hydroxyl ions in the electrolyte as well as to aid in establishing a potential at the sensing electrode indicative of the pH of the electrolyte. However, inasmuch as the low range threshold sensitivity of the system has now been found to be primarily and directly related to changes in hydrogen partial pressure that occur at the surface of the sensing electrode, prior systems utilizing hydrogen in the aforementioned manner have been found to be limited to the determination of nitrogen content in amounts of about 5–10 parts per million (p.p.m.) and above, by weight of sample, with reproduction tolerances of about ±10%.

In the coulometric analysis of petroleum stocks for nitrogen content, having boiling points above 500° C., it can be found that quantitatively generated ammonia is often absorbed prior to entry into the titration cell. Under such conditions, the true concentration of nitrogen by volume in the original sample is not indicated by the resulting titration record.

Further, contaminated effluent gases can be generated in the catalyst section and enter the titration cell. Contaminants of petroleum materials may include both trace materials found within the petroleum sample, such as sulfur and arsenic compounds, as well as incompletely reacted hydrocarbons. For this reason, relatively inert metals, such as platinum, are usually used to form the sensing and generating electrodes. However, such construction advantages have not prevented the contamination problem, in toto, and further processing of the electrodes is usually required on a daily basis. Since a coulometer titration system represents a substantial capital investment, the contamination problem and the need to devote time to processing contaminated electrodes thereby decreasing the time available to analyze samples, tends to depreciate the economic advantage of the equipment.

In view of the fact that many of today's hydrocarbon conversion processes require both fast and accurate trace nitrogen content of complexed petroleum materials in the ultramicroscale, i.e., within fractions of 1 part per million (p.p.m.) by weight of sample, it is an object of the present invention to provide a novel, low level, but durable, coulometer titration system for accurately and reproducibly determining total nitrogen content of petroleum materials in a range of at least 10 parts per million with a reproduction tolerance of about 0.05 p.p.m., and preferably in a range of fractions of 1 part per million, with minimum reproduction tolerance of about ±0.02 p.p.m. by weight of sample.

In one aspect of the present invention, advantage is taken of the fact that higher volumetric batch samples of petroleum materials containing a constituent to be analyzed for, such as nitrogen, can be mixed effectively with hydrogen gas at an elevated temperature prior to pyrolytic hydrogenation in the presence of a catalyst, by the construction of a mixing chamber between the inlet and catalyst sections of the system. Preferably, the mixing chamber includes a single helically wound hollow tube having a T-joint at its input end for entry of the petroleum sample and the hydrogen gas and an outlet connected to the pyrolytic catalyst section. Accordingly, the invention makes possible thorough mixing of the sample and hydrogen as the sample vaporizes, prior to entry into the catalyst section. A U-shaped preheating tubular section may connect to the T-joint to allow the hydrogen gas to be placed in heat transfer contact with the gas before it is mixed with the petroleum sample. Accordingly, by elevating the temperature of the mixture of sample and hydrogen gas prior to entry into the catalyst section, coking within the catalyst section is minimized. Since coke deposits strongly absorb the ammonia, total nitrogen determinations are correspondingly improved. Further, a low pyrolysis temperature can be used, resulting in faster system operations.

The present invention also contemplates the use of a nickel catalyst within the catalyst section to pyrolize the petroleum sample in the presence of hydrogen. Catalytic reaction is carried on at temperatures between 750 and 850° C. with a temperature of 800° C. being preferred. An alkaline absorber section is connected between the catalyst section and the coulometric titration cell to remove effluent gases which otherwise contribute to a change in potential within the cell. Flow rate of the hydrogen gas within the catalyst is controlled within a range of 300 to 500 ccs. per minute. Accordingly, not only is the residence time of the ammonia within the catalyst chamber minimal, but the concentration of hydrogen gas within the catalyst section is relatively large. Accordingly, for nitrogen determination, the possibilities of ammonia decomposing to nitrogen gas are minimized.

Another aspect of the invention contemplates the electrolytic generation, in situ, of an acidic or basic titrating agent by means of an electric current responding potentiometrically to the presence of a basic or acidic component, respectively, of a gas stream absorbed within a hydrogen saturated electrolyte. In this aspect of the invention, with further attention to the determination of the concentration of nitrogen in a petroleum sample, advantage is taken of the fact that changes in potential due to the ammonia are developed between a hydrogen-dissolved-in-palladium sensing electrode and a conventional reference electrode disposed in the electrolyte. It has been found that for use in coulometer titration analysis systems, a stored hydrogen-palladium sensing electrode with hydrogen-palladium atomic ratios of about 0.03 to 0.60 is a surprisingly durable and highly responsive hydrogen anode to indicate ultraminute changes in hydrogen ion concentration of the electrolyte. At the upper H/Pd atomic ratio limit, the electrode is completely saturated with hydrogen; at the lower H/Pd atomic ratio limit, minimum absorption of hydrogen has occurred. Accordingly, changes in potential due to changes in hydrogen partial pressure are substantially dampened to thereby define a potential-time characteristic of reduced magnitude and extended period, while changes thereof due to changes in hydrogen ion concentration are substantially unaffected. The change in potential is monitored by a controller which generates a current proportional to the change in potential for generating hydrogen ions, in situ, to react with hydroxyl ions (basic component) of the absorbed ammonia and return the pH of the electrolyte to an original set point level. The current generated proportional to the change in hydrogen partial pressure is at a dampened rate quantitatively related to the dampened potential-time characteristic developed between the stored hydrogen sensing electrode and the reference electrode. The current flow is indicated by means of a potentiometric recorder to allow identification of ultraminute quantities of the nitrogen, by weight, within the petroleum sample, say down to fractions of 1 part per million with minimum reproduction tolerances and irrespective to changes in hydrogen partial pressure within the electrolyte. For example, for a nitrogen containing petroleum sample, the present invention has provided nitrogen determination in the range of .01 p.p.m. with a reproduction tolerance of ±.02 p.p.m.

Further objects and advantages of the present invention will become more apparent from the following detailed descriptions taken in conjunction with the following drawings in which:

FIG. 1 is a schematic diagram of the coulometer titration system in accordance with the present invention;

FIG. 2 depicts, in elevational view, partially cut away, the input and mixing section, the pyrolytic section and the alkaline absorber section of the coulometer-titration system of FIG. 1;

FIG. 5 is a record produced by the recorder of FIG. 3.

Figure 3:
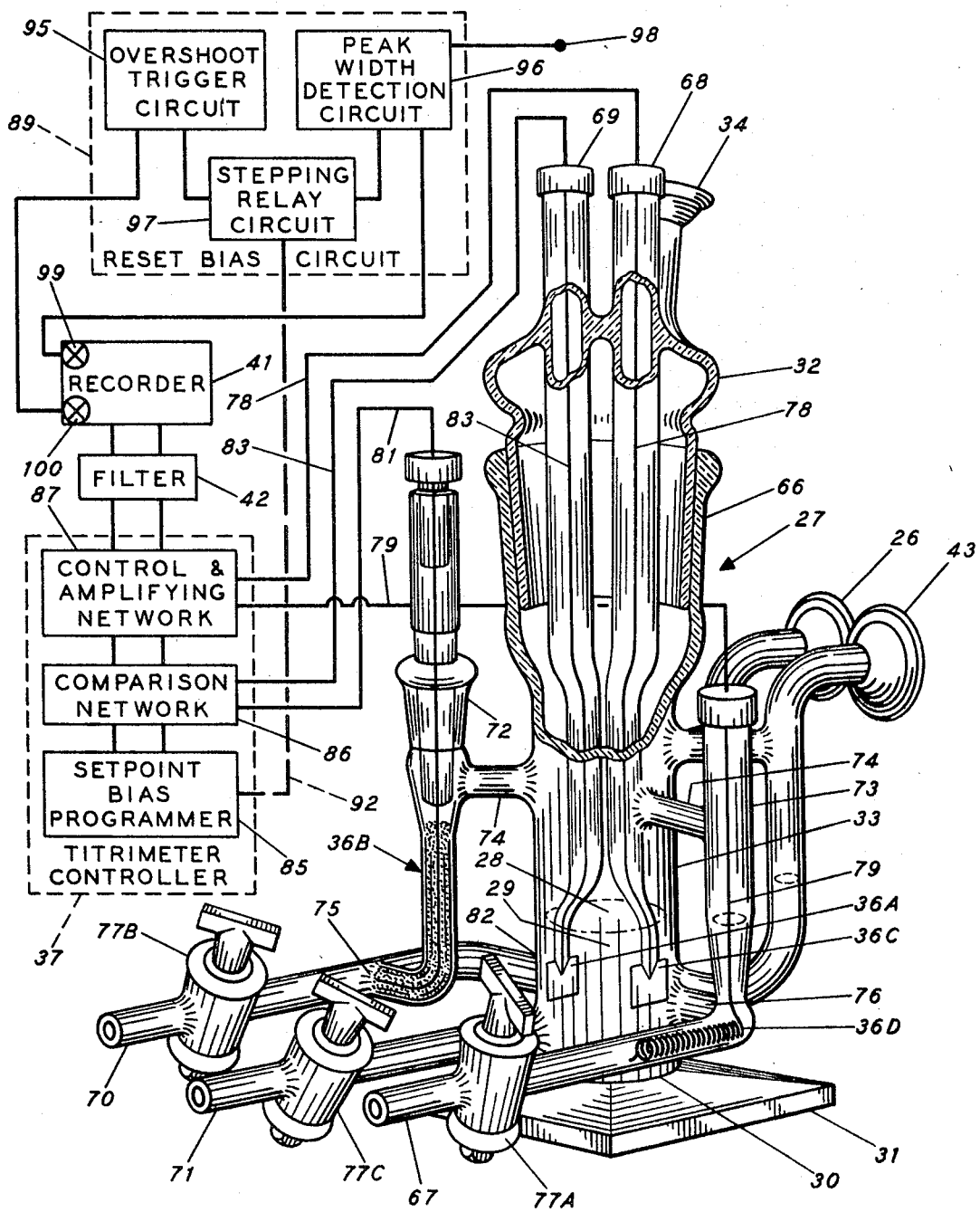
FIG. 3 is a perspective view of the titration cell of the system of FIG. 1 in which associated electrical circuitry including a controller is suitably connected between electrodes within the cell and a recorder.

Referring now to FIG. 1, the invention in one form is illustrated for the determination of the nitrogen content in a petroleum hydrocarbon sample. Although this illustration is of only one constituent—nitrogen—the principles can be used singularly or in combination for the determination of a number of other constituents where accuracies in the ultramicroscale are desired.

Briefly, in carrying out the present invention, a batch sample of petroleum oil containing the component to be analyzed is injected into septum 12 supported within septum holder 13 by means of a plunger-operated syringe (not shown). After the needle of the syringe has entered a tube within septum 13, the sample is injected as droplets into the sample inlet tube 14 at about its junction 16A with hydrogen conveyance tube 16 by movement of the plunger of the syringe relative to a central reservoir. The septum 12 and septum holder 13 are cooled by passing cooling water from a reservoir (not shown) through tubes 15 wound in helical manner as shown.

Molecular hydrogen is passed into sample inlet tube 14 by conveyance tube 16 which connects to the inlet tube 14 at junction 16A. The hydrogen from hydrogen purification unit 11 and under initial control of valve 20A and flow meter 21A conveys the sample through mixing chamber 17, catalyst section 18 and thence to titration cell 27. Additional molecular hydrogen is added at inlet 18B of the catalyst section 18 by means of conveyance tube 19 under the control of valve 20B and flow meter 21B. After the sample of molecular hydrogen has been thoroughly mixed and vaporized in chamber 17, the mixture of hydrogen gas and the sample is catalytically reacted in catalyst section 18 to form lower molecular weight hydrocarbon compounds. As previously mentioned, in the hydrogenation and pyrolysis of the sample, the nitrogen is quantitatively converted to ammonia and conveyed with other effluent gases through alkaline absorber section 22, the ball joints 24 and 25 and inlet piping 26 to titration cell 27. Alkaline absorber section 22 prevents acidic effluent gases of section 18 from entering the cell. As shown, a multistage furnace 23 surrounds mixing chamber 17, catalyst chamber 18 and scrubber section 22 for heating the sample and molecular hydrogen or the reaction products thereof to preselected elevated temperatures.

Still referring to FIG. 1, the titration cell 27 includes a central reactor zone 29 for support of a body of dilute aqueous, sodium sulfate electrolyte, preferably saturated with hydrogen gas, through which the ammonia is bubbled. A cap 32 is mounted atop side wall 33 through which extends a vent 34. Within the reaction zone 29 is located a series of electrodes generally indicated at 36 connected to rebalancing controller 37 through conducting means 38 penetrating the cell, as shown. Two of the electrodes—called the sensing and reference electrodes and indicated at 36A and 36B in FIG. 1—establish a potential directly related, inter alia, to the hydrogen ion concentration of the electrolyte. The established potential is equal and opposite to a null, or set point bias voltage, appearing across a resistor (not shown) connected to suitable source of supply (also not shown) in the controller 37.

If no ammonia is passed into the cell the pH of the electrolyte body has a value usually maintained in a range of 4.0 to 10.0 with about 6.0 being preferred. When ammonia is bubbled through the body of the electrolyte, an increase in the basic component being analyzed for, i.e. the hydroxy ion, occurs and the resulting pH change in the electrolyte causes a change in the voltage produced by reference and sensing electrodes 36A and 36B from that initially produced and balanced by the aforementioned set point bias voltage level.

The change in voltage, or error voltage, is produced at the controller 37 and has a magnitude measured with respect to null point voltage level, i.e. set point bias voltage level, produced by the controller. The controller 37 includes a power amplifier having isolated input and output stages which responds to the voltage change for causing current to flow by way of conducting means 38 to generating electrodes 36C and 36D within the cell 27 by an amount just sufficient to generate enough hydrogen ions in the electrolyte body to react with the excess hydroxyl ions. As a result, the pH of the electrolyte body returns to its original set point level as the voltages appearing in opposition at the controller 37 are rebalanced. The time rate of current flow between the electrodes 36A and 36B is directly proportional to the time rate of change of hydrogen ions reacting with the excess hydroxyl ions resulting from the ammonia. The current time characteristic is continuously monitored by a potentiometric recorder 41 connected to the power amplifier of controller 37 through a high frequency filter 42 so as to accurately indicate, in coulombs, the rate of electricity flowing to the generating electrodes 36C and 36D.

From the foregoing description, it can be seen that the apparatus and method of the present invention titrates the absorbed ammonia of the sample after pyrolytic hydrogenation in the presence of a catalyst, or more precisely, monitors the reaction of the hydroxyl ion, resulting from the ammonia absorption, with the electrolytic generated hydrogen ion. It may further be seen that the current required to maintain a constant hydrogen ion concentration within the titrating cell is a measure of the basic content of the ammonia quantitatively produced from the nitrogen compounds of the hydrocarbon samples at the catalytic section of the system. The concentration of a sole basic (or acidic) component, such as provided by ammonia absorption in the electrolyte, may be continuousyl recorded on the recorder 41.

The time base record for the nitrogen analysis of two slugs of a hydrogen sample of the recorder 41 is indicated at 41A and, as shown, includes positive peaks 43 indicating the fact that after the two slugs were injected, in sequence, into the systems, pyrolytically reacted and ultimately entered the titration cell, there was reduction in pH of the electrolyte followed by the generation of electrolyzing current to produce sufficient hydrogen ions to reacts with the hydroxyl ions produced by the ammonia previously quantitatively produced from the nitrogen of the two slugs. As well known, the integrated area of the individual peaks 43 is directly related to the total concentration of nitrogen in the sample. Recorder 41 may be a conventional potentiometric recorder, preferably a strip chart recorder. Controller 37 may be of any suitable design. An integrator for indicating the area of peaks 43 may be a disk type such as Model 475, Varian Electronics, Palo Alto, Calif., in which the area is determined by counting the strokes of a moving pen arm.

The electrode reactions taking place within the titration cell at pH values between 4.0 and 10 are the following:

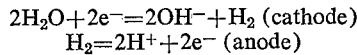

$$2H_2O + 2e^- = 2OH^- + H_2 \text{ (cathode)}$$
$$H_2 = 2H^+ + 2e^- \text{ (anode)}$$

In this regard, the reaction of the anode could also involve the oxidation of water such as

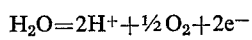

$$H_2O = 2H^+ + \tfrac{1}{2}O_2 + 2e^-$$

The rate of addition of titrating agent, and therefore the magnitude of the titrating agent generating current, is proportional to the amount of nitrogen present assuming the pyrolytic hydrogenation of the petroleum sample is sufficiently rapid and the conversion of nitrogen to ammonia takes place quantitatively. The absorption of the ammonia within the electrolyte also must take place with uniform efficiency to insure reproducible results.

In addition to molecular hydrogen conveying the sample to the mixing chamber 17, the catalyst section 18 and the alkaline absorber section 22, molecular hydrogen can also be passed directly to the titration cell 27 as by means of conveying pipe 43. The rate of flow of the excess titration hydrogen is seen to be under the control of valve 20C and flow meter 21C. Excess molecular hydrogen within the electrolyte body as well as other gaseous products, can be vented from the cell 27 through vent 34 in the cap 32. During operations, molecular hydrogen bubbles and effluent gases from the catalyst section are agitated by a magnetic wand (not shown) located at bottom wall 30 of the cell in electromagnetic coupling contact with driving means within housing 31.

FIG. 2 illustrates mixing chamber 17, catalyst section 18 and alkaline absorber section 22 in more detail. Mixing chamber 17 and catalyst section 18 may be unitarily formed, say of glass. Mixing chamber 17 includes a tubular mixing section 50 composed of a helically wound hollow tube formed of plurality of turns 52 and unitarily joined, at one end, to hydrogen conveyance tube 19 at junction 19A and, at the other end, to sample inlet tube 14 and hydrogen conveyance tube 16 at junction 16A to form a T-joint therewith. Turns 52 of the central mixing chamber are seen to be of equal diameter and equally spaced along the central longitudinal axis of the mixing section. In forming the mixing chamber, it is desirable to choose the pitch of the turns 52 such that the mixing efficiency of the hydrogen and petroleum sample is maximized per unit distance of travel along the mixing chamber. In this aspect of the invention, advantage is taken of the fact that the direction of the differently molecularly weighted sample and hydrogen is constantly undergoing change as they spiral through the mixing chamber. In view of the foregoing, it will be apparent that the increased mixing efficiency provided by the mixing chamber of the present invention allows higher volumes of samples to be injected at input tube 14. In this regard, sample slug (batch) volumes of about 10–60 microliters can be used in the present invention. Sample slugs of about 20–30 microliters are preferred. It has been found that for sample volumes in the above-identified range, the injection duration should be rather long, say within a range of 10–60 seconds so as to preferably define an injection rate of about 1 microliter per second.

Still referring to FIG. 2, hydrogen conveying tube 16 includes a U-shaped central tubular section 53 extending interior of the central section 50. One end of the U-shaped hollow tube 53 connects to the inlet tube 14 at junction 16A; the other end connects through a socket joint and a remote section of tube 16 to a reservoir of hydrogen (not shown). In operations, the temperature of the molecular hydrogen is elevated prior to its initial contact with the sample by passing the sample in a tortuous path through U-shaped tube 53. It will be apparent that the temperature of the molecular hydrogen can be increased by increasing the number of passes prior to contact with the sample.

In the present invention, advantage is also taken of the structural characteristics of the inlet section 14 and the mixing chamber 17 to achieve substantially uniform temperature gradients along the mixing chamber. The temperature of the sample is elevated within the mixing chamber 17 to cause vaporization of the sample by the addition of heat thereto from both the cylindrical furnace 23 of FIG. 1, and, initially, from the molecular hydrogen preheated within U-tube 53. Abrupt changes in temperature within the mixing chamber after vaporization of the sample tends to increase the likelihood of coke being formed within the mixing chamber. Coke is known to be an absorber of nitrogen. By reducing the amount of coke formed within the mixing chamber, there is less likelihood of the nitrogen within the sample being absorbed. In view of the foregoing, the importance of forming the turns 52 of section 50 of constant diameter with respect to the longitudinal axis of the mixing chamber, and of preheating the hydrogen within U-tube 53, can be understood. As shown in FIG. 1, the circumferential surfaces of the turns are concentrically spaced with respect to the curved heating coils of the cylindrical furnace 23 so that external heating of the sample and hydrogen is accordingly uniform. Heat transferred to the sample by the preheated hydrogen also contributes to the avoidance of abrupt temperature changes within the mixing chamber.

To demonstrate the importance of avoiding abrupt changes in temperature within the mixing chamber 17, a series of petroleum samples containing a known amount of nitrogen (1.5 p.p.m. nitrogen standard from carbazole dissolved in silica gel-treated isotane) were injected into inlet tube 14, conveyed in the presence of hydrogen through a nonuniformly heated mixing chamber (temperature inlet=600° C.; temperature outlet=400° C.) and thence to uniformly heated catalyst section 18. The quantitatively converted nitrogen was titrated in the titration cell and the nitrogen content calculated from the resulting record. With each successive injection of carbazole sample, a noticeably thicker coke deposit was observed in the cooler section of the mixing chamber. Table I sets forth the results of the test.

TABLE I

[Effect of coking (1.5 p.p.m. N Standard)]

| | Found, p.p.m. N | Sample size, microliters |
|---|---|---|
| Injection sequence: | | |
| 1 | 1.51 | 11 |
| 2 | 1.50 | 11 |
| 3 | 1.43 | 11 |
| 4 | 1.42 | 26 |
| 5 | 1.46 | 26 |
| 6 | 1.33 | 26 |
| 7 | 1.38 | 51 |
| 8 | 1.29 | 51 |
| 9 | 1.22 | 51 |
| 10 | 1.20 | 11 |
| 11 | 1.14 | 11 |

As shown, the calculated nitrogen content of the samples showed a noticeable deviation from the standard as the coke thickness within the mixing chamber increased. By contrast, where the mixing chamber is uniformly heated as taught by the present invention, the amount of coke formed—and hence the amount of nitrogen absorbed from the sample thereon—has been found to be insignificant.

Catalyst section 18 consists of an enlarged tubular section 18A forming a suitable housing for catalyst such as nickel shot 54 and includes reduced end portions 18B and 18C. A ball 55, say of nickel wire, is wound into a circular cross section and inserted at each end portion of the catalyst section to mechanically support catalyst 54 and prevent its escape from the central section 18A during operations.

Nickel catalyst has several advantages in carrying out the present invention. The higher temperature of the catalyst, say in the range of 775–825° C., allows pyrolysis of all hydrocarbons in a petroleum sample. A further advantage results from a reduction in coke accumulation within the catalyst section. At temperatures below the aforementioned range, coking has been found to readily occur, however. A large excess of hydrogen gas and the shortness in residence time of the ammonia also has been found to reduce the likelihood of the ammonia being decomposed to nitrogen gas and escaping detection within the catalyst section. At temperatures higher than the aforesaid range, nitrogen may react in a manner to suggest strong bonding with the catalyst. Although the condition is temporary, residence time of the sample within the catalyst section may be significantly increased.

Regeneration of the catalyst is accomplished by passing oxygen at approximately 200 ccs. per minute over the catalyst for 10–20 minutes. Argon is used, say 400 ccs./minute for 5 minutes, to sweep the hydrogen from the tube before oxygen is introduced, and to remove the oxygen before restarting the hydrogen gas flow.

Alkaline absorber section 22 includes a central tube 57 concentrically disposed within the outlet section 18C of catalyst section 18. Socket 58, disposed at the exterior of the end section 18C, sealably receives enlarged ball 59 to form ball and socket joint 24. A second joint 25 is formed at the remote end of the scrubber section 22, ball 60 being sealably retained within socket 61. To retain the scrubbing material 62, preferably potassium carbonate in granular form, glass fibrous balls 63 and 64 are positioned at spaced apart locations in the scrubber section. The potassium carbonate is maintained at an elevated temperature, say 475°–550° C. with 500° C. being preferred during operation of the system.

The rate of flow of hydrogen gas within the mixing section 17, the catalyst section 18 and the titration cell 27 can be critical. Within the mixing chamber 17 sufficient hydrogen must be available to thoroughly mix with the incoming sample to avoid coking, as previously mentioned. To provide sufficient hydrogen for this purpose, flow rates of 150–250 ccs. have been found to be adequate with 200 ccs. per minute being preferred.

At the catalyst section, additional hydrogen is added, say at junction 19A between conveying tube 19 and inlet end section 18B, thereby bringing the total hydrogen flow rate through the catalyst section into a range of 300–500 ccs. per minute with about 400 ccs. per minute being preferred. Within the titration cell additional hydrogen can also be added but is not necessary in carrying out the present invention. By the use of molecular hydrogen at the aforesaid flow rates, advantages are obtained in attaining proper mixing of the sample and molecular hydrogen within the mixing chamber as well as 100% quantitative conversion of the nitrogen compounds to ammonia within the catalyst section without introducing excess noise within the titration cell.

As shown in FIG. 3, titration cell 27 is shown in the form of a cylindrical vessel but, if desired, may be of any size or shape. As previously mentioned, the cell includes a flat bottom wall 30 particularly adapted for use with a stirring wand (not shown) located within hydrogen gas saturated electrolyte body 28. Side wall 33 of the cell is provided with an outward tapered upward portion 66 to provide a disconnectable connecting sealing joint with cap 32 through which extends vent 34 and hollow columnar electrode support appendages 68 and 69. Adjacent to the bottom wall 30, the side wall 33 is penetrated by electrolytic inlet and exit pipes 67, 70, 71; inlet pipe 26 connected to the catalyst section; and molecular hydrogen input tube 43. Control of ingress and egress of the electrolyte is by means of stopcocks 77A, 77B and 77C attached to pipes 67, 70 and 71, respectively. Electrode support appendages 72 and 73 are also attached to the side wall 33, as by arms 74. Fluid contact of the interior of appendage 72 is made within inlet tube 70 at junction 75, while fluid contact of the interior of appendage 73 is made with side wall 33 at junction 76.

Electrode support appendages 68, 69, 72 and 73 position a generating and sensing electrode assembly within the titration cell 27. As shown in the figure, anode 36C of the generating electrode assembly is disposed within the reaction zone 29 of the cell and may be formed with a flat rectangular appearance of noble metal such as platinum. Conductor 78 is spot welded to the anode 36C and passes through electrode support appendage 68 for connection to control and amplifying network 87 of the controller 37. Helically wound cathode 36D of the generating electrode assembly is located within electrode support appendage 73. Conductor 79 is attached to the cathode 36D and passes through the electrode support appendage 73 for connection to the control and amplifying network 87 of the controller 37 as shown. Reference electrode 36B of the sensing electrode assembly may be formed of conventional materials such as a lead-lead sulfate construction disposed within electrode support appendage 72 as shown. A conductor 81 is attached integrally to the reference electrode and passes through the appendage 72 for connection to comparison network 86 of the controller 37. Glass frits or equivalents thereto are placed at junctions 75, 76, as well as at junction 82 at the junction of inlet tube 70 and the side wall 33 of the cell. Between the frits at junctions 75 and 82 a solution of aqueous sodium sulfate is placed in contact with the reference electrode 36B. The glass frits not only form a receiving cavity for the sodium sulfate, but the frit at junction 76 also restricts diffusion, within the reaction zone 29, of the hydroxyl ions generated at the generator cathode 36D.

The present invention contemplates the use of a sensing electrode 36A formed of hydrogen-dissolved-in-palladium. The electrode 36A is attached, as by a glass or plastic weld or seal, to electrode support appendage 69 at the interior remote end thereof to thereby place the electrode within the reaction zone 29 of the titration cell. The electrode 36A is connected to comparison network 86 of the controller 37 by way of conductor 83 disposed, as shown, interior of hollow support appendage 69. It has been found that "stored hydrogen" palladium hydrogen sensing electrodes in accordance with the present invention are surprisingly efficient when operated in conjunction with a coulometer-titration system containing a hydrogen saturated electrolyte. Palladium used for forming the aforementioned electrode can be present as a fine particulate layer on a conducting support base; as a thin sheet; as a precipitated layer overlaying a palladium sheet; or in any convenient form which permits the facile migration of hydrogen into the palladium surface.

In one aspect of the present invention, the precipitated layer of palladium is formed on the surfaces of a palladium substrate. In this aspect, it has been found that a palladium foil substrate, say 0.7 cm. x 0.7 cm. x .01 cm. thick, can be used as a cathode of a plating bath, while a platinum wire is used as the anode. A platinum wire conductor for the electrode is provided by spot welding the conductor to the foil and, in turn, fusing the conductor and weld in glass tubing or plastic. Other preliminary steps to plating also include: (1) cleaning the palladium substrate with concentrated nitric acid; and (2) rinsing with distilled water.

The bath electrodes are immersed in a stirred plating solution, say containing 8% (wt./vol.) $PdCl_2$ and a 7% (vol./vol.) HCl plating solution, until a palladium black coating is formed on the palladium foil substrate. A current density of about 50 ma./cm.$^2$ for approximately 30 seconds has been found to be adequate. The density of the resulting palladium black coating may be in the range of about 0.5 to 5.0 mg. of palladium per square cm. of surface area with 1.0 to 2.0 mg. of palladium per square cm. being preferred. It should be noted that very heavy coating can cause entrapment of plating solution, while too light a coating can result in an easily poisoned electrode. After a correct plating density is achieved, the electrode is thoroughly washed with distilled water. Molecular hydrogen is then introduced into the palladium by a convenient method, say hydrogen saturation, in situ, of the electrolyte in the titration cell 27.

In various modifications of the invention, it is also contemplated that hydrogen may be introduced into the palladium by: (1) absorption from hydrogen gas under pressure, or (2) use of the palladium as a cathode in an electrolysis cell. Molecular hydrogen absorption is continued until the hydrogen-palladium atomic ratio of the resulting electrode is between approximately .03 and .60.

When molecular hydrogen is introduced into the palladium by means of hydrogen saturation of the electrolyte of the titration cell, sufficient time must be allowed to attain the aforementioned range of H/Pd atomic ratios. For a palladized "stored hydrogen" palladium electrode having the aforementioned density of palladium black, a residence time of at least six hours at one atmosphere of pressure is usually needed to attain the lower H/Pd atomic ratio limit. A preferred time is twelve hours. At the upper H/Pd atomic ratio limit, the electrode is fully saturated with hydrogen so that the metallic state of the electrode is $\beta$ phase while at the lower limit, minimum hydrogen absorption has occurred so that the metallic state is the $\alpha+\beta$ phase. With the above H/Pd atomic ratio limits, it has been found that the resulting sensing electrodes exhibit remarkable sensitivity, stability and durability, even in the presence of contaminating materials, compared with conventional platinum electrodes when used in conjunction with the coulometer titration system of the present invention.

Figure 4:
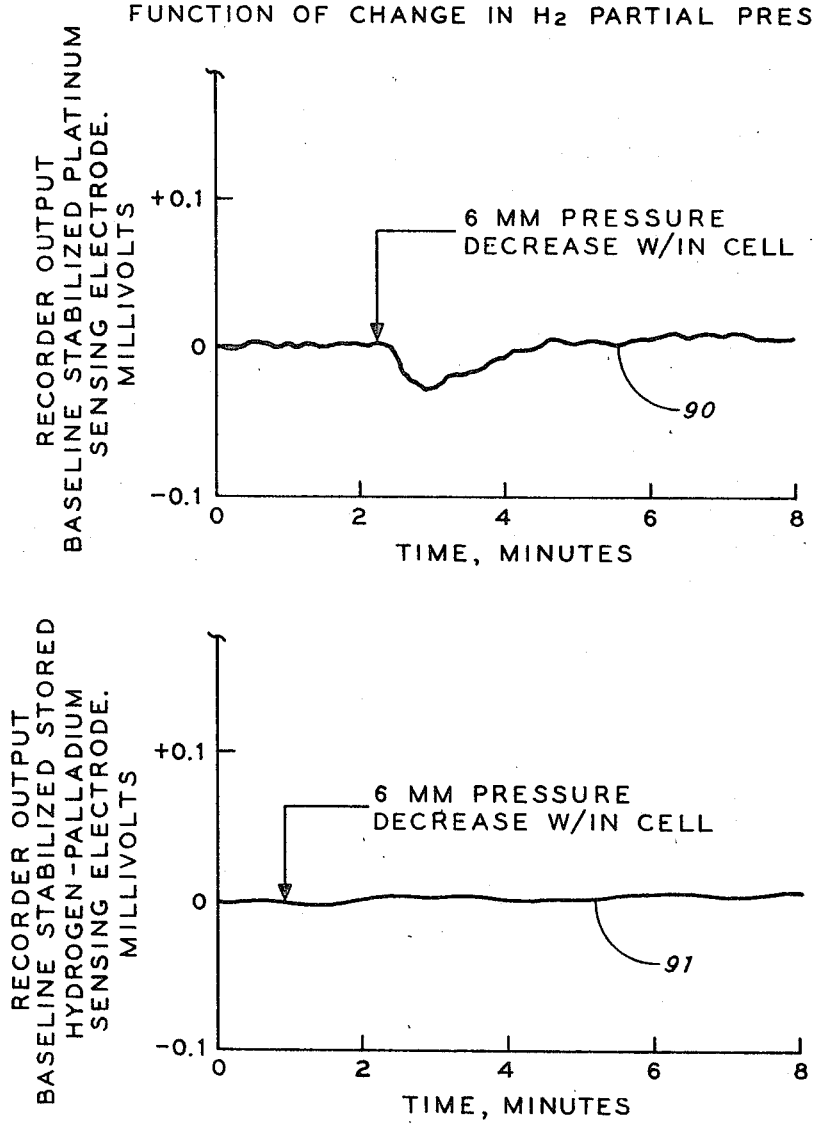
FIG. 4 is a series of graphs comparing the response of two sets of potential electrodes, one set including a hydrogen-palladium sensing electrode and the other set including a conventional platinum sensing electrode, as a function of change of hydrogen partial pressure within the titration cell of FIG. 3.

FIG. 4 illustrates the increased stability of the stored hydrogen-palladium electrode of the present invention as compared with a conventional platinum black/platinum electrode. In the test, the stored hydrogen-palladium electrode consisted of a 0.7 cm. x 0.7 cm. x .01 cm. thick palladium foil coated with about 1.2 mg. of palladium black per square cm. of surface area. The platinum black/platinum electrode was a ½ cm. x ½ cm. x 0.1 cm. thick platinum foil coated with platinum black. In each test, the reference electrode was a lead-lead sulfate electrode connected to the controller 37. The stability of the sensing electrodes were compared as a function of change in hydrogen partial pressure within the titration cell. The hydrogen partial pressure was adjusted to the same level for each electrode and the results monitored by the recorder. To adjust the atmosphere within the cell, a length of flexible tubing was connected to the cell cap; a joint was formed in the tubing, one end of which was connected directly to an open-ended monometer and the other end to an adjustable control valve. The pressure within the cell was then adjusted about 6 mm. relative to atmospheric pressure and the results recorded by the recorder.

Optimum bias voltage for each electrode set was obtained taking into account the electrode activities of each electrode set, the concentration of the electrolyte and, in the case of the stored hydrogen-palladium electrode, the existing H/Pd atomic ratio. The bias voltage for each electrode set may be computed from the following equation, neglecting over-voltage:

$$E_{bias} = E°_{(Pb-PbSO_4)} + E°_{(H_2-H^+)} + \frac{RT}{nF} \log \frac{[H^+]}{[H_2]^{1/2}}$$

where $$\frac{RT}{nF} = 0.059$$

R being the gas constant,
T being the temperature (70° F.),
n being the number of electrons in the reaction at the sensing electrode, and
F being the Faraday.

In FIG. 4, curve 90 represents the change in potential, with time, produced between the platinum electrode and the lead-lead sulfate reference electrode as the atmosphere in the cell was abruptly changed 6 mm. For the same magnitude of pressure change, curve 91 represents the change in potential, with time, produced between the stored hydrogen-palladium electrode of the present invention and the same reference electrode. For this test, the stored hydrogen-palladium electrode was palladized with a precipitated palladium layer overlaying a palladium foil substrate in the manner previously described. The hydrogen-palladium atomic ratio of the electrode was about .03. The density of the palladium layer was about 1.2 mg./cm.² For the aforementioned pressure change, the platinum electrode (Curve 90) is seen to indicate a significant change in potential. While the potential-time characteristic of the stored hydrogen-palladium electrode (Curve 91) is of reduced magnitude but of increased (extended) time duration indicating the fact that the rate of change, with time, of the potential was substantially dampened.

A comparison of the time duration of response of the stored hydrogen-palladium electrode with that of the platinum electrode shows the time duration of the improved palladium electrode is much longer, about 6 minutes to 2½ minutes for the platinum electrode. The shape of the potential-time characteristic of the stored hydrogen-palladium electrode has been found to be a direct function of its existing H/Pd atomic ratio. As a consequence of the dampened rate of change in potential, the hydrogen ions are generated within the cell by means of a flow of current at a dampened rate quantitatively related to the rate of change, with time, of the potential appearing between the stored hydrogen-palladium electrode and lead reference electrode due to change in hydrogen partial pressure within the titration cell.

For changes in hydrogen partial pressure encountered under normal conditions, as within a laboratory building, a stored hydrogen-palladium electrode having a H/Pd atomic ratio of about .6 has been found to provide excellent dampening characteristics. Under similar operating conditions, electrodes having lower H/Pd atomic ratios down to .03 are adequate.

Reconditioning of the stored hydrogen-palladium electrode is carried out when poisons accumulate on the electrode, although the rate of accumulation as evidenced by electrode performance has been found to be much less than that of conventional platinum electrodes by a margin of almost 4:1. For a palladized electrode, the electrode is removed from the titration cell and placed in a stripping bath of nitric acid for removal of the palladium black precipitated layer. Thereafter the foil is reactivated by the addition of palladium black layer followed by diffusion of hydrogen in the manner previously described.

FIG. 5 illustrates a recorded record produced by the coulometer titration system of the present invention. In producing the record, two (2) 30 microliters samples of an identical batch of hydrofined petroleum product (boiling point=700° F.) were injected into the coulometer titration system shown in FIGS. 1 and 2. an optimum set point bias setting of about 0.08 volt was established in opposition to that appearing between the stored hydrogen-palladium sensing electrode and the conventional lead-lead sulfate reference electrode. pH of the 0.04% sodium sulfate electrolyte body was approximately 6.00. Flow rates of the molecular hydrogen within the mixing chamber and catalyst section were approximately 200 ccs. per minute and 400 ccs. per minute, respectively.

In the plot, the ordinate is in terms of millivolts and represents the electrical current flow to the generating electrodes to produce hydrogen ions within the cell proportional to the total quantity of ammonia titrated. Curves 93 and 94 represent the voltage-time characteristics of response and illustrate the fact that for the total voltage developed between the improved sensing electrode of the present invention and a reference electrode due to the introduction of ammonia-related hydroxyl ions into the cell, the change in rebalancing current, after a large abrupt change, is seen to be more gradual as the pH of electrolyte gradually returns to the set point level of the electrolyte. Total nitrogen content of each sample was calculated by integrating the area under each recorded peak based on the conversion of the current response of the apparatus to the quantity of ammonia titrated per unit time, using Faraday's Law, but without the use of any calibration factors. The curves and the resulting total nitrogen determination demonstrate the fact that even though changes in hydrogen partial pressure have occurred at the surface of the sensing electrode simultaneously with the introduction of the ammonia, the quantity of current flowing in response thereto is at a dampened rate as compared to the simultaneous production of current due to the presence of the hydroxyl ions within the cell. The coulometer titration system of the present invention accordingly can provide nitrogen content determinations that are both accurate and highly reproducible in the ultramicroscale range irrespective of the occurrence of changes in hydrogen partial pressure within the titration cell.

A modification of the controller 37 is shown in FIG. 3 for use with the present invention. As shown, the controller 37 includes set point bias programmer 85 for establishing a set point concentration of titrant within the reaction zone 29 of the cell 27. Voltage generated by the programmer 85 proportional to the desired concentration is compared in comparison network 86 with the potential between sensing electrode 36A and reference electrode 36B of the cell 27. An error voltage is generated by the control and amplifying network 87 through a power amplifier therein as the pH level of the cell is changed.

The most satisfactory set point bias setting for the coulometer titration system of the present invention is obtained by obtaining a record for a test sample, or its equivalent, having the narrowest peak width response without sufficient overshooting and oscillation. In this regard, a bias setting of about 0.080 volt is optimum for a stored hydrogen-palladium sensing selectrode and lead-lead sulfate reference electrode. The resulting hydrogen ion concentration in an aqueous sodium sulfate electrolyte body, say 0.4% $Na_2SO_4$, is about a pH of 6. If the pH is more basic than 6 there is greater sensitivity but less stability. If the pH is more acid then 5.5, the system becomes too sluggish for economical, repetitive testing operations.

As described in detail in Pat. No. 2,758,079, "Electrolytic Determination of the Concentration of a Constituent in a Fluid," E. L. Eckfeldt, the input circuit of the amplifier of network 87 may be isolated from the effects of the direct current derived from the output circuit of the amplifier by means of a vibrator or synchronous rectifier driven at the same frequency as the input vibrator to provide alternating voltages for the generation of a magnified unidirectional current for generating the titrant ions within the electrolyte. The current is indicated by means of potentiometric recorder 41 and filter 42. The control and amplifying network 87 may also include appropriate circuitry for accurate control of the electrolyizing current to maintain the pH of the electrolyte at a predetermined set point level. Accordingly, the circuitry may provide proportional, rate and reset control actions as well known in the control art.

The magnitude of the set point bias voltage level established at set point bias programmer 85 must take into account of concentration of the electrolyte body as well as the existing hydrogen-palladium atomic ratio of the H/Pd sensing electrode 36A. In one aspect of the present invention, it is contemplated that the stored hydrogen-palladium electrode may operate at an atomic ratio of .30. Accordingly, during operations within a hydrogen saturated electrolyte, the stored hydrogen-palladium atomic ratio of the electrode increases as more hydrogen is absorbed. Consequently, the magnitude of the reference bias setting may have to be re-evaluated from time to time. To automatically reset the magnitude of the bias prior to each run, the present invention contemplates the use of a reset bias circuit 89 connected through mechanical linkages 92 to a variable resistor arm within set point bias programmer 85.

Reset bias circuit 89 may include a peak width detection circuit 96 for comparing the time-width of the generated peak of the record with respect to a standard time width, a stepping relay circuit 97 operatively connected to mechanical linkages 92 to reset the set point bias programmer 85 as well as an overshoot trigger circuit 95 also connected to the stepping relay circuit 97. The present invention contemplates that the peak width detector circuit 96 includes a relay having a time delayed response, the magnitude of the delay being of a preselected time duration. The actuation of the relay and delay is provided by a microswitch (not shown) positioned at the inlet spetum of the system which is actuated as the sample is injected into the system to provide a trigger signal at the terminal 98 of the peak width detection circuit 96. A direction-responsive microswitch 99 is attached to the pen arm of the recorder 41 to deactivate the relay of the detection circuit 96 if a preset voltage level is recorded on the tail, or negative slope, of the generated response curve prior to the actuation of time delay relay. If the predetermined level occurs after the relay delay period has elapsed, however, the detection circuit 96 triggers operation of stepping relay circuit 97 including a transformer and stepping relay to reset, by mechanical linkages 92, the set point bias programmer 85 to a higher setting.

Complementary overshoot trigger circuit 95 provides control action to reset set point bias programmer 85, to a lower setting, in the event of overshoot or oscillation of the recorded signals at recorder 41. For generating overshoot control, a second microswitch 100 is attached to pen arms of the recorder to actuate trigger circuit 95 if overshoot beyond a predetermined set point level occurs. Trigger circuit 95 can be of conventional design, say include a thyratron which is provided with a signal by the actuation of microswitch 100 to cause the thyratron to fire. An impulse of current will then flow through the operating coil of the stepping relay circuit 97. The relay operates to control mechanical linkages 92 through a suitable mechanical device, say a toothed wheel. It will be observed that the operations of peak width detection circuit 96 and overshoot trigger circuit 95 are complementarily. Only one of the circuits, either the detection circuit 96 or the trigger circuit 95, will operate at any one time during the reset operation. It will be readily apparent to those skilled in the art that use of the reset bias circuit 89 will only occur after all operating parameters within the coulometer titration system other than hydrogen absorption by the sensing electrode have been established. It should be further observed that the rate of reset action is constant since the fixed sources of energy are used to operate stepping relay circuit 97. Accordingly, the magnitude of reset is in stepped increments, say a few millivolts per reset operation.

While certain preferred embodiments of the invention have been specifically disclosed, it should be understood that the invention is not limited thereto as many variations will be readily apparent to those skilled in the art. For example, the invention may be used in the analysis of constituents which produce hydrogen ions in the electrolyte, the apparatus of the present invention being responsive to produce hydroxyl ions in sufficient amounts to balance the aforementioned hydrogen ions. Furthermore, by ascertaining the flow rate of a continuous flowing sample, the present invention can also be used to determine the concentration of a constituent within the sample. Accordingly, in this application, the term "sample" is used in relation to constituent analysis to mean either individual batch ("discontinuous") tested material or flowing material analyzed in a continuous manner. The invention is to be given its broadest possible interpretation within the terms of the following claims.

I claim:
1. In a coulometer titration system for use in determining the presence and concentration of a constituent in a sample of liquid material, including (a) a mixing chamber for mixing hydrogen gas with said sample, (b) pyrolytic chamber means connected to said mixing chamber for pyrolyzing said sample to form a gas stream thereof, said gas stream including a quantitatively related gaseous component of said constituent selected from the group consisting of acidic and basic components, (c) furnace means for heating said pyrolytic chamber means, (d) a titration cell adapted to contain a hydrogen saturated electrolyte subject to pressure variations for absorbing said selected component of said constituent and thereby changing the hydrogen ion concentration (pH) of said electrolyte from a predetermined pH set point level, (e) potential producing electrodes including a hydrogen sensing electrode and a reference electrode disposed in said electrolyte for sensing said change in hydrogen ion concentration from said pH set point level by means of a voltage produced between said reference and sensing electrodes, (f) controller means connected to said potential producing electrodes for generating a flow of current in response to said voltage quantitatively related to said selected component, (g) a pair of current electrodes connected to said controller means and adapted to electrolytically produce in said electrolyte in response to said flow of current just enough of a component reactable with said selected component being analyzed for, to neutralize said selected component, to thereby return said hydrogen ion concentration to said predetermined pH set point level, and (h) recording means maintaining a continuous record of said flow of current so as to indicate the concentrations of said component being analyzed for, the improvement wherein:

(a) is a mixing chamber connected to said pyrolytic chamber means having a central tubular section for spirally mixing said sample and hydrogen gas prior to entry with said pyrolytic chamber means, said central section comprising a helically wound hollow tube formed with a plurality of helical turns of approximately the same diameter, said central section having inlet means connected thereto to pass said sample and said hydrogen gas into said central section and outlet means connected between said central section and said pyrolytic section, and wherein said inlet means includes additional tubular inlet means for said hydrogen gas adapted to convey said gas in a tortuous path coextensive with a portion of and disposed within said central section so as to elevate the temperature of said hydrogen gas prior to contact with said sample, and (c) is a cylindrical furnace concentrically disposed about said helically wound hollow tube to vaporize said sample and heat said hydrogen gas during spiral passage therethrough, (e) includes an improved hydrogen-dissolved-in-palladium sensing electrode adapted to be disposed in said electrolyte having a hydrogen-palladium atomic ratio greater than 0.03 and up to and including 0.60 adapted in combination with said reference electrode, to dampen the rate of change, with time, of a potential developed between said improved sensing electrode and said reference electrode due to change in hydrogen partial pressure at the surface of said improved sensing electrode so as to define a potential-time characteristic of reduced magnitude and of increased time duration to thereby extend the response range of said system to detect low concentrations in said gas stream of said selected component being analyzed for, and (f) is said controller means connected between said improved sensing and said reference electrodes and said current electrodes for generating said flow of current to said current electrodes to produce said neutralizing component, said controller means being adapted to generate said flow of current in response (i) to said voltage related to said selected component being analyzed for, and (ii) to said potential related to said change in hydrogen partial pressure, said flow of current in response to said hydrogen partial pressure change being at a dampened rate quantitatively related to said rate of change, with time, of said potential previously developed in response to said change in hydrogen partial pressure so as to extend said response range of said system.

2. The improvement of claim 1 wherein said tubular inlet means for said hydrogen gas is a U-shaped hollow tube.

References Cited

UNITED STATES PATENTS

| | | | |
|---|---|---|---|
| 2,899,280 | 8/1959 | Whitehead et al. | 23—230 |
| 2,933,293 | 4/1960 | Ferrari, Jr. | 23—230X |
| 3,461,042 | 8/1969 | Martin et al. | 204—1 |
| 3,427,238 | 2/1969 | Myers et al. | 204—195 |
| 3,497,322 | 2/1970 | Boys | 204—195X |

OTHER REFERENCES

Ronald L. Martin, Analytical Chemistry, vol. 38, No. 9, pp. 1209–1213, (1966).

Serial No. 529, 134, p. 3, Feb. 21, 1966.

GERALD L. KAPLAN, Primary Examiner

U.S. Cl. X.R.

204—1